INVENTOR.
Thomas C. Sharp
ATTORNEY.

INVENTOR.
Thomas C. Sharp
ATTORNEY.

United States Patent Office 2,782,349
Patented Feb. 19, 1957

2,782,349

MOTOR SPEED CONTROL SYSTEM

Thomas C. Sharp, North Hollywood, Calif., assignor to Radio Corporation of America, a Delaware corporation Application August 21, 1953, Serial No. 375,607

5 Claims. (Cl. 318—44)

This invention relates to motor speed control systems, and particularly to systems for controlling the speed of advancement of motion picture film.

Interlock or self-synchronous motor systems in the production of motion pictures are well-known. In this type of system, a master distributor maintains driving motors for a plurality of units such as cameras, sound recorders and reproducing units, in synchronism during acceleration, during periods of uniform speed, and during deceleration.

With the advent of television, wherein a picture must end at a certain time in order to maintain a pre-arranged time schedule, it is desirable that the speed of the film be increased or decreased from time to time so that the end of the picture occurs at the proper time in the program. Furthermore, if a picture is being presented on one film and sound on another, it is desirable that a speed control of one of the films be available in the even that they get out of synchronism by one frame or a certain number of sprocket holes. A synchronizing system for motors operating at different speeds is disclosed and claimed in my U. S. Patent No. 2,560,485 of July 10, 1951.

The present invention is directed to a speed control of either a single composite film being projected or for a sound film with respect to a picture film or vice versa. The control feature resides in a rotary transformer or frequency changer connected to a motor which may have its direction of rotation reversed.

The principal object of the invention, therefore, is to facilitate the control of the speed of advancement of a motion picture film.

Another object of the invention is to provide an improved system for controlling a variation in the speed of advancement of a motion picture film.

A further object of the invention is to provide an improved system for controlling the speed of advancement of one motion picture film with respect to another.

Although the novel features which are believed to be characteristic of this invention, both as to its organization and the mode of its operation, as well as additional objects and advantages thereof, will be better understood from the following description, when read in conjunction with the accompanying drawings, forming a part hereof, in which.

Figure 1:
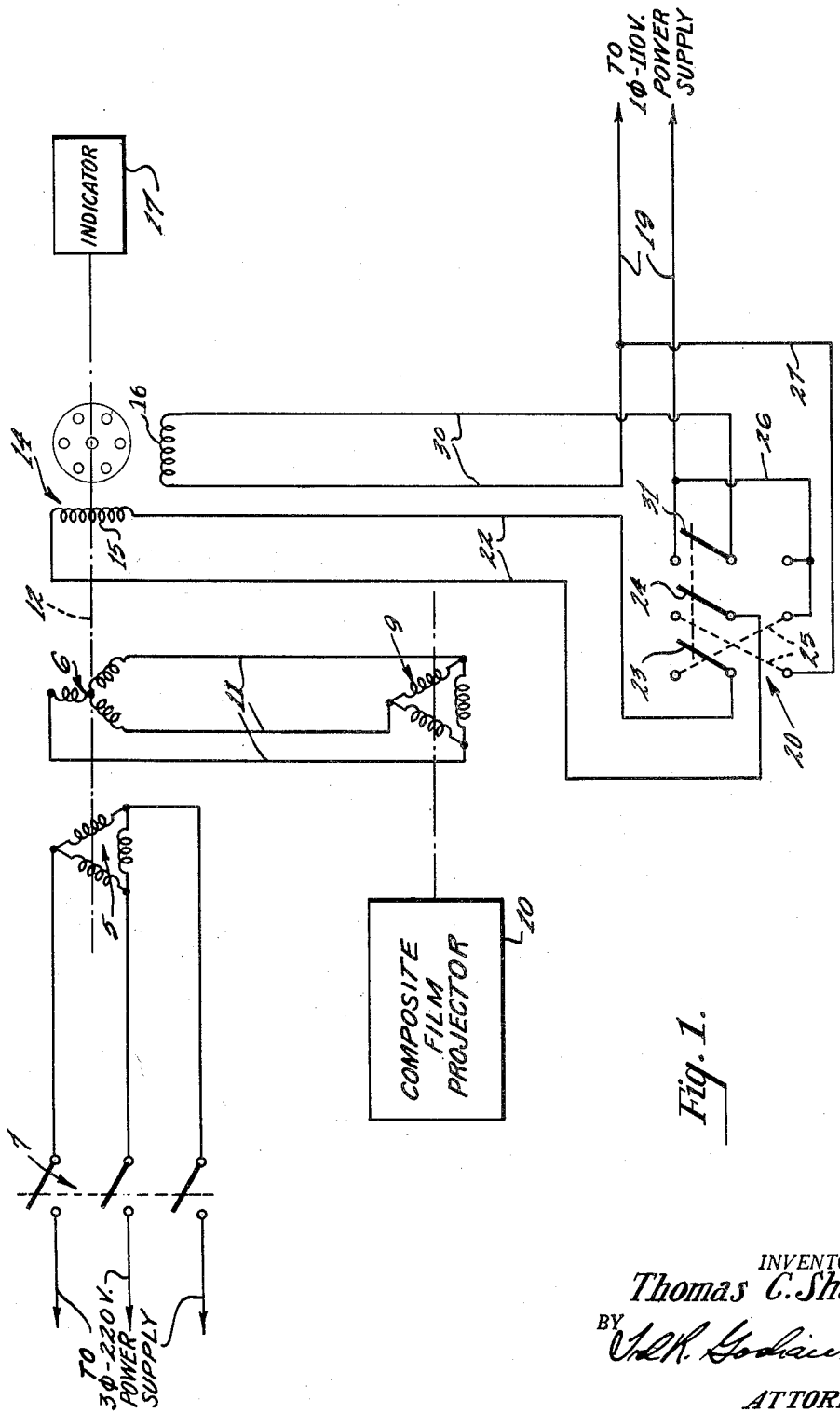
Fig. 1 is a schematic view of a system for controlling a single motor.

Referring now to the drawings, and particularly to Fig. 1, a rotary transformer or frequency changer unit includes a stator 5 and a rotor 6, the stator being connected to a three-phase 220-volt power supply when a switch 7 is closed. The rotor 6 of the rotary transformer is connected to a synchronous motor 9 which drives a film advancing unit 10 which may be a composite film projector. The frequency of the current in conductors 11 connecting the rotor 6 to the motor 9 may be varied by the rotation of the rotor 6. The rotor 6 of the rotary transformer has connected to its shaft, as indicated by the broken line 12, a single-phase reversible motor 14 having a field winding 15 and a rotor winding 16. Also connected on shaft 12, is a speed, time, or footage indicator 17.

The single-phase motor 14 is energized from a single-phase 110-volt power supply over conductors 19 after connection by a triple-pole, double-throw switch 20. That is, for one direction of rotation of the motor 14, the switch is thrown to its upper position, whereby winding 15 is connected over conductors 22, switch blades 23 and 24, crossed conductors 25, and conductors 26 and 27, to the power supply. The winding 16 is connected over conductors 30 and switch blade 31 to the single-phase power supply. When the switch is thrown to its lower position, the connections to the winding 16 will remain the same while the connections to the winding 15 will be reversed, thereby reversing the direction of rotation of the motor 14.

The above-described control system will permit the motor 9 to be increased or decreased in speed. That is, if the indicator 17 shows that the end of film being projected will come at 7:15 when it should end at 7:13, the switch 20 may be closed in the proper direction to increase the speed of motor 9 so that the indicator 17 will show that the film will end at the exact time of 7:13. The rotation of rotor 6 to increase the speed of motor 9 will be in a direction to increase the frequency in conductors 11. To reduce the speed of motor 9, the direction of rotation of motor 14 will be reversed to decrease the frequency in conductors 11.

Figure 2:
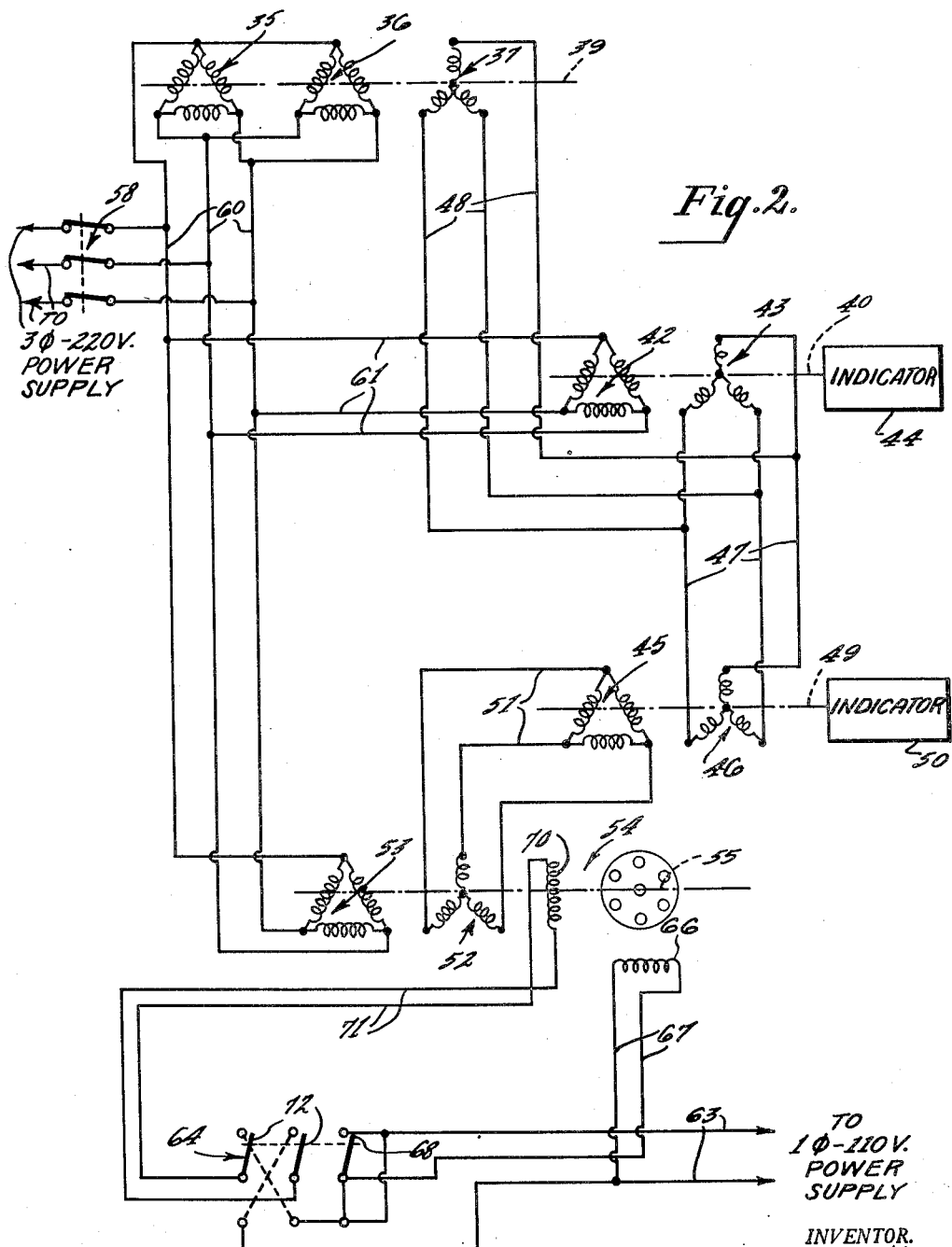
Fig. 2 is a schematic diagram of a system for synchronizing one film with another.

Referring now to Fig. 2, a system is shown for maintaining synchronism between two films. Fig. 2 shows a master distributor which includes a synchronous driving motor 35 and a distributor having a stator 36 and a rotor 37. A connecting shaft is indicated by the broken line 39. Also included in this system is a motor having a stator 42 and a rotor 43 which may be a motor for driving a sound reproducer. On the shaft of motor 42—43, indicated by broken line 40, is a time, speed, or footage indicator 44.

Another motor of the system comprises a stator 45 and a rotor 46, which may be used for driving a motion picture film projector. The rotor 43 is connected to the rotor 46 over conductors 47 and to the rotor 37 of the distributor over conductors 48, as is normal practice in interlock motor systems. On the shaft of motor 45—46, indicated by broken line 49, is a time, speed, or footage indicator 50. The stator 45 of the picture projector is connected over conductors 51 to the rotor 52 of a rotary transformer, as shown in Fig. 1, and having a stator 53 and a single-phase reversible motor 54. The shaft of the rotary transformer is indicated by the broken line 55. The synchronous driving motor 35, the distributor stator 36, the sound reproducer stator 42, and the rotary transformer stator 53 are connected to a three-phase, 220-volt power supply when a switch 58 is closed over conductors 60 and 61.

The single-phase reversible motor 54 is connected to a single-phase, 110-volt power supply over conductors 63 when a triple-pole, double-throw switch 64 is closed in either its upper or lower positions. The winding 66 of motor 54 is connected to the power supply over conductors 67 and the right-hand blade 68 of the switch 64 when in either position. However, the winding 70 of motor 54 is connectable in reverse polarity over conductors 71 by switch blades 72 when thrown to either their upper or lower positions. In this manner, the motor 54 may be reversed in direction the same as the motor 14 in Fig. 1.

Synchronization may thus be easily maintained between the picture and sound films or any two films being advanced by motors 42—43 and 45—46 by controlling the speed of the film being advanced by motor 45—46 with respect to the film being advanced by motor 44—43. If the indicators 44 and 50 are for footage, time, or speed, they can be maintained in step by the control of motor 54 by switch 64. That is, should the picture film, driven by motor 45—46, be ahead of the sound film, driven by motor 42—43, the speed of motor 45—46 is decreased by decreasing the frequency of the interlocking current in conductors 51. This is accomplished by rotating rotor 52 in a certain direction by motor 54. If the picture film is behind the sound film, the motor 54 is reversed in direction to increase the interlocking frequency between the rotor 52 and the stator 45.

In the manner just described, therefore, the two films may be maintained in synchronism by the simple operation of switch 64.

I claim:

1. A motor speed control system comprising a first motor having a wound stator and a wound rotor, a second motor having a wound stator and a wound rotor, a distributor having a wound stator and a wound rotor, means for interconnecting all of said rotors, a rotary transformer having a wound stator and a wound rotatable rotor, said rotor being normally stationary, means for connecting said transformer rotor to said second mentioned motor stator, a reversible motor mechanically connected to said transformer rotor for rotating said rotor in one of two directions for varying the number of revolutions of said second mentioned motor within a predetermined period, means mechanically connected to said first motor for indicating the number of revolutions of said motor within a predetermined period, and means mechanically connected to said second motor for indicating the number of revolutions of said second motor within a predetermined period, the difference between the indications of said indicating means showing the difference in revolutions between said motors within a predetermined period.

2. A motor speed control system in accordance with claim 1, in which a power supply is provided, together with a synchronous motor mechanically connected to said distributor rotor, said stator of said distributor being connected to said stators of said first mentioned motor and said rotary transformer and to said power supply.

3. A motor speed control system in accordance with claim 1, in which a power supply for said reversible motor is provided, together with means for reversing the application of power to said reversible motor.

4. A system for varying the speed of one motor with respect to another in an interlock system comprising a distributor having a stator and a rotor, a motor for driving said rotor at a constant speed, a first motor having a stator and a rotor, a second motor having a stator and a rotor, a rotary transformer having a fixed winding and a rotatable winding, both of said windings being normally stationary, a three-phase power source, means for connecting said source to said distributor driving motor, the stator of said distributor, the stator of said first motor, and the fixed winding of said rotary transformer, means for interconnecting the rotors of said distributor and of said first and second motors, means for connecting the stator of said second motor to the rotatable winding of said rotary transformer, means for rotating said rotatable winding to vary the frequency of the current impressed on the stator of said second motor to vary the number of revolutions of said second motor within a predetermined time period, an indicator mechanically connected to said first motor for indicating the number of revolutions thereof within a predetermined time period, and means mechanically connected to said second motor for indicating the number of revolutions thereof within said predetermined time period, the difference in said indicators showing the variation in revolutions of one of said motors with respect to the other of said motors.

5. A system in accordance with claim 4, in which said last mentioned means includes a reversible motor mechanically connected to said rotatable winding of said rotary transformer.

References Cited in the file of this patent
UNITED STATES PATENTS

| | | |
|---|---|---|
| 1,486,929 | Slepian | Mar. 18, 1924 |
| 1,913,208 | Morrill | June 6, 1933 |
| 2,368,504 | Vrooman | Jan. 30, 1945 |
| 2,685,055 | Winther | July 27, 1954 |